(No Model.)

2 Sheets—Sheet 1.

J. S. WATERMAN.
MACHINE FOR CUTTING GEARS.

No. 401,987.  Patented Apr. 23, 1889.

WITNESSES.

INVENTOR.

(No Model.) 2 Sheets—Sheet 2.

J. S. WATERMAN.
MACHINE FOR CUTTING GEARS.

No. 401,987. Patented Apr. 23, 1889.

WITNESSES. INVENTOR.

UNITED STATES PATENT OFFICE.

JOHN S. WATERMAN, OF PROVIDENCE, RHODE ISLAND, ASSIGNOR TO THE BROWN & SHARPE MANUFACTURING COMPANY, OF SAME PLACE.

MACHINE FOR CUTTING GEARS.

SPECIFICATION forming part of Letters Patent No. 401,987, dated April 23, 1889.

Application filed June 28, 1888. Serial No. 278,430. (No model.)

*To all whom it may concern:*

Be it known that I, JOHN S. WATERMAN, of the city and county of Providence, in the State of Rhode Island, have invented a new and useful Improvement in Apparatus for Cutting Toothed Gears; and I do hereby declare that the following specification, taken in connection with the drawings, making a part of the same, is a full, clear, and exact description thereof.

By my invention hereinafter described a saving in time of more than seventy-five per cent. is accomplished over any method for cutting machine-gears heretofore employed. The improvement consists in adapting a progressively-cutting broaching-tool similar to that used for various purposes in the mechanic arts for the new use of cutting the teeth of gear-wheels or of toothed racks. This I accomplish by means of an apparatus which may be a special machine, or which may be easily applied as an attachment to various machine-tools—as, for example, a planer—in use for other purposes than gear-cutting in machine-shops. It consists of a suitable holder for a blank, which may be a circular disk or a bar, either straight or curved, to be furnished with teeth to form a toothed wheel or a toothed rack, hinged to or so connected with a firm resistance-piece that after a space has been cut in such disk or bar, the side walls of which form the confronting sides of two adjacent teeth, the said holder can be raised clear of the broaching-tool which cuts such space and the blank be moved a prescribed distance to present a fresh surface for the action of the broaching-tool, and thus successively form the teeth of the gear or rack. In combination with the said hinged or movable holder is a progressively-cutting broaching-tool, which is mounted upon and secured to a traveling bed, so that at each single traverse of the bed the tool will cut to its full depth the space between two adjacent teeth of a gear or rack to be formed and fashion the side walls of the same properly for the required character of the tooth. An index-plate—such as is well known in gear-cutting machines—is used in connection with the blank to be supplied with teeth, to enable the operator to turn or move the blank through the proper distances to space the teeth.

Figure 1:
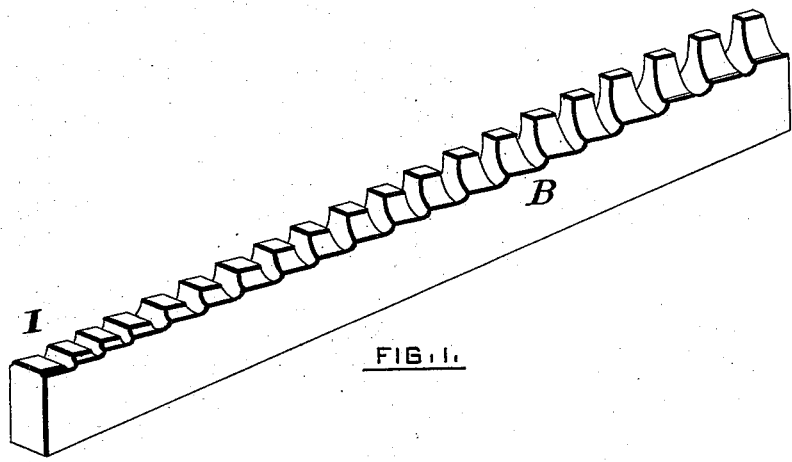
Figure 2:
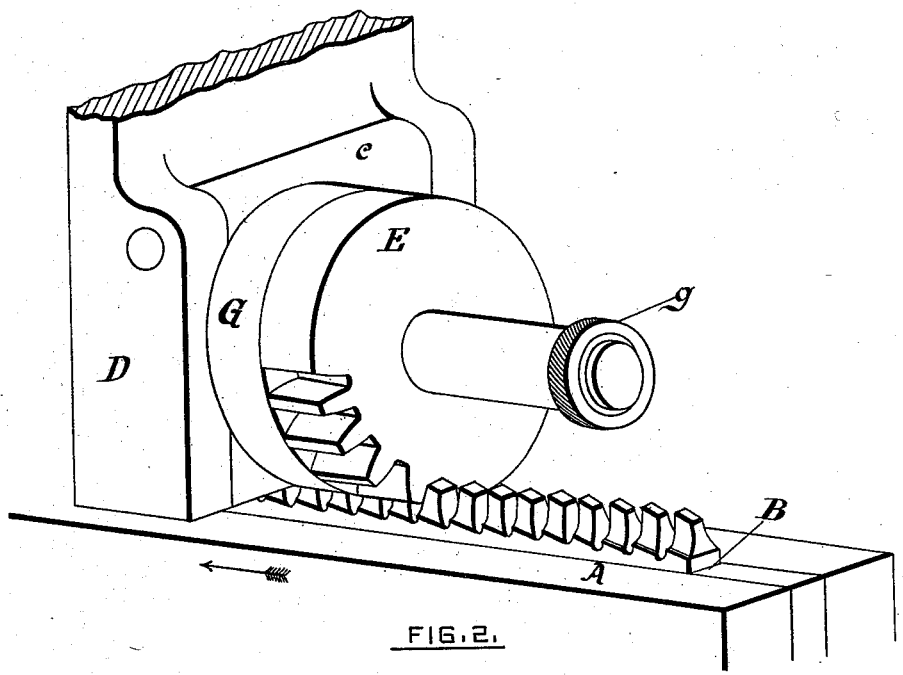
Figures 3, 4:
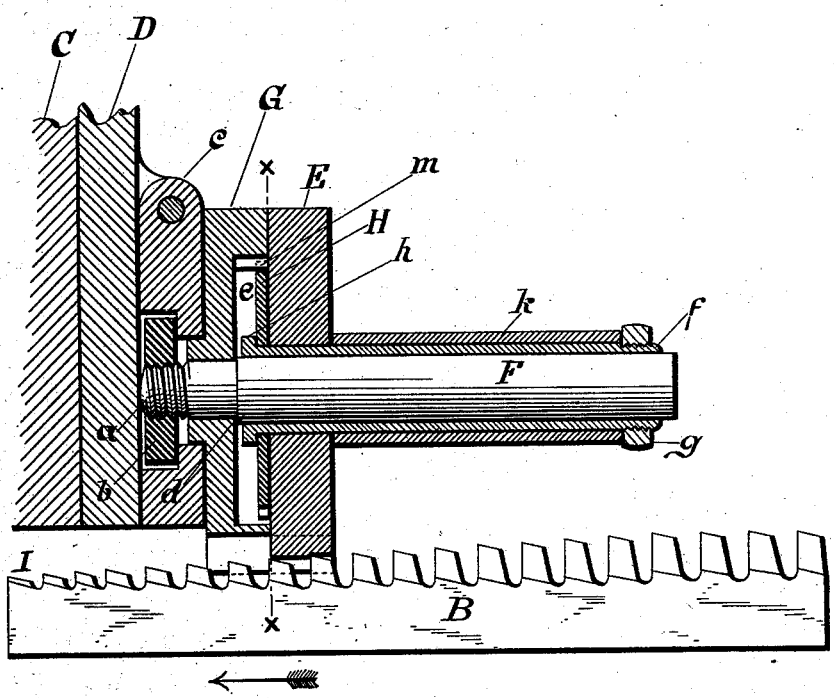

In the accompanying drawings, Figure 1 is a perspective of the progressively-cutting broaching-tool. Fig. 2 is a perspective of a portion of a common planer with the broach mounted on its bed and showing a gear-blank partially cut. Fig. 3 is a vertical longitudinal section through the planer-head shown in Fig. 2, the broach being shown in the act of cutting a tooth on the gear-blank. Fig. 4 is a vertical transverse section on line X X of Fig. 3, showing an index-plate for spacing the teeth to be cut on the blank.

I have represented in the drawings a simple apparatus which will fully illustrate the improvement, and which can be applied without difficulty to an ordinary planing-machine. The blank in this instance to be furnished with teeth is a circular metallic disk of a size suitable to make, when toothed, a required machine gear-wheel. If a rack is to be cut, a bar of proper size should be substituted for the circular disk and the holder for the same should be appropriately changed.

A, Fig. 2, represents a bed, in general like that of a planing-machine, and which, by well-known machinery, is to be made capable of traversing in a horizontal plane to and fro through a prescribed path. Upon this bed is firmly clamped or otherwise secured a broaching-tool, B, also shown in perspective at Fig. 1. The characteristic of this tool is that it is provided with cutting-teeth, which progressively cut deeper and wider a space in the edge of the blank subjected to its action, and so that when the traversing bed has made a complete movement in the direction for cutting the space between two adjacent teeth will be cut to the full depth and the form of the side walls be of the proper form, determined on for the confronting working-faces of such teeth. I prefer that the last four or six teeth should be shaped so as to finish by very light-dressing cuts the channel which has been more roughly formed by the preceding teeth in the series. While this broaching-tool is similar to tools which have been used for cutting "key-slots," it is specifically different from any such tools with which I am acquainted, in the particular that the cutting-faces of the teeth are set in transverse planes which are alternately at opposite angles of obliquity to each other, whereby a smooth cut with less tendency of the tool to chatter is secured. The side walls of the cutters are shaped so as to produce any particular pitch of the tooth required for the gear or rack.

C is a fixed standard or resistance-piece forming a part of the frame of the machine. In this particular instance it will be recognized as that portion of the frame of a planer to which the hinged "clapper-block" of the tool-carrier in a planer is attached.

D indicates the clapper-block, which is arranged in the usual way to slide vertically in ways or guides in the standard C, so that in a planing-machine the tool can be set at any position relatively to the surface of the thing to be planed.

In my apparatus it is necessary to have a suitable holder for the blank, so constructed and combined with the other parts of the apparatus that the blank held by it can have different portions of its surface equidistant from each other presented successively to the broaching-tool.

E represents the circular metallic blank which is to be converted into a toothed gear. A central spindle or shaft, F, is furnished with a screw-cut end, and by means of a nut, b, thereon the shaft is set horizontally and held firmly attached to the hinged clapper c of the block D, as well also as the backing-plate G through which such shaft passes, there being a shoulder cut in the shaft F at d, which takes bearing against said plate. Consequently both the shaft F and the backing-plate for the gear-blank are secured to the clapper c.

The interior of the backing-plate G is recessed, as shown at e. On the shaft or spindle F is placed a sleeve, f. Its outer end is threaded, and is provided with a nut, g. Its inner end is furnished with a head or flange, h.

There is applied to the back of the blank E an index-plate, H. (Shown in face view at Fig. 4.) The blank to be cut, with the index-plate, having been slipped upon the sleeve f, another sleeve, k, is slipped on the sleeve f, with one end bearing against the blank E and the other within the range of the nut g. Consequently when the nut g is turned the blank E and the index-plate H will be clamped together, so that both, as an integrity with the sleeves f and k, can be slid forward on the shaft F or be removed therefrom altogether. When the same are in place, as shown in the drawings, the index-plate is combined with the backing-plate by means of a downwardly-extending pin or feather on the latter, which enters one of the spaces m of the index-plate, as indicated in Fig. 4.

Now, supposing that the apparatus has been arranged as indicated at Fig. 3 and the bed carrying the broaching-tool B set in motion, the edge of the blank E, which at the commencement rests on the non-cutting part I of the broach, will be acted upon by the successive teeth of the tool, and when the full traverse has been completed in the direction of the arrow a space will be cut in the blank the depth of which is to the extent required for the engagement of the teeth of a fellow-gear therewith and the side walls of which are shaped to the proper form for the working-face of one tooth and the back face of the next adjacent tooth. It now becomes necessary to set the blank to a new position, so that on the next succeeding traverse of the bed and tool in the same direction a second space will be cut, which will leave intermediate of such two spaces a completely-finished tooth. This in the apparatus shown in the drawings can be accomplished by turning upward the clapper c on its hinge, which will raise the blank E clear of the broaching-tool B. The blank E, together with its index-plate H, clamped thereto, can now readily be slid forward a short distance on the shaft F, so as to clear the feather m from engagement with the notch in the index-plate and be turned on the shaft for the distance required to present a fresh surface to the action of the broaching-tool, and be then slid backward, so as to bring the feather m or detent into engagement with the next notch in the index-plate. The shaft is now brought to the horizontal again by turning downward the clapper upon its hinge, the bed carrying the broaching-tool is again put in motion in the direction of the arrow, and the preceding operation of cutting a space is repeated until the complete toothed wheel has been cut.

In case a rack is to be cut an arm may be attached to or form a part of the clapper c. This arm should stand at right angles with the path of movement of the traveling bed which carries the broaching-tool, instead of extending, as the shaft F does, in a line corresponding in direction with the path of the bed. The under face of this arm should be provided with a dovetail groove for receiving the tongue or correspondingly-shaped spline on the back of the holder for the blank to be cut with teeth, the lower or opposite face of such holder being provided with down-hanging lips, between which the blank bar is placed, and by clamp-screws passing through one of the lips may be firmly held against the other lip, it being always understood that the blank to be so held must extend below the lips of the holder far enough to allow the broaching-tool to cut the spaces between the rack-teeth to their full depth without coming into contact with the holding-lips. An index-plate for spacing the teeth to be cut can be readily combined with the holder so supported by the sliding in the horizontal frame.

It is apparent that in place of the simple apparatus shown and described, requiring hand manipulation, an automatic machine can be substituted which would embody substantially the same essential mode of operation. So, also, instead of having the holder movable relatively to the broaching-tool, the broaching-tool could be made to be movable relatively to the holder and the blank to be cut by causing the same to alternately rise to a higher and sink to a lower plane in a recess cut in the traveling bed, after the manner of the movement of the platens of some varieties of printing-machines.

What I claim as my invention, and desire to secure by Letters Patent, is—

1. The combination of a holder for a gear-blank, in which holder the blank shall be adjustable to successive positions, and a traveling bed carrying a progressively-cutting broaching-tool for cutting the spaces between adjacent teeth, the said holder and the said broaching-tool being arranged to be movable relatively toward or from one another, substantially as described.

2. The combination of a holder for a gear-blank, in which holder the blank shall be adjustable to successive positions, a traveling bed carrying a progressively-cutting broaching-tool for cutting the spaces between adjacent teeth, the said holder and the said broaching-tool being arranged to be movable relatively toward or from one another, and a tooth-spacing mechanism for fixing the successive adjustments of the blank to the broaching-tool, substantially as described.

JOHN S. WATERMAN.

Witnesses:
S. J. MURPHY,
W. H. THURSTON.